June 29, 1937.     R. A. POWERS     2,085,671

MEASURING AND SORTING APPARATUS

Filed Sept. 3, 1935     2 Sheets-Sheet 1

INVENTOR
RALPH A. POWERS.
BY
ATTORNEYS

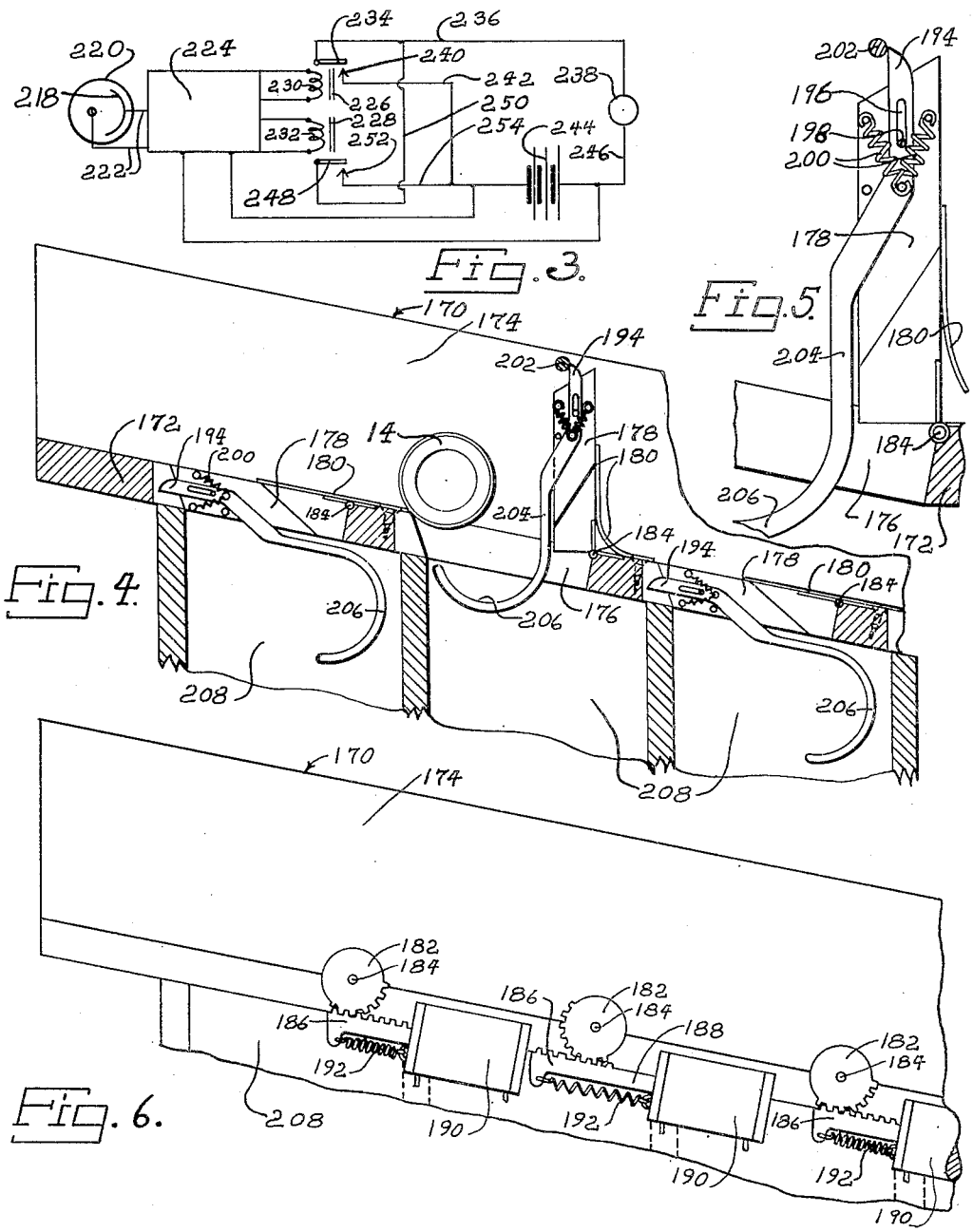

Patented June 29, 1937

2,085,671

UNITED STATES PATENT OFFICE 2,085,671

MEASURING AND SORTING APPARATUS

Ralph A. Powers, Grosse Pointe, Mich., assignor to Electronic Control Corporation, Detroit, Mich., a corporation of Michigan Application September 3, 1935, Serial No. 38,914

16 Claims. (Cl. 209—82)

This invention relates to improved grading and measuring apparatus.

More particularly the invention pertains to photo-electric apparatus for measuring, sorting and grading roller bearings and the like.

One of the main objects of the invention is to provide an improved measuring, sorting and grading device of this character by which a larger number of sizes may be measured, graded and sorted than the number of photo-electric cells used.

Another object of the invention is to provide apparatus of this character which requires only one light source for the operation of a plurality of photo-electric cells.

A further object of the invention is to provide measuring, sorting and grading apparatus in which no mechanically articulated parts that are subjected to wear are relied upon for measuring, magnifying or multiplying operations.

A still further object of the invention is to provide an improved electric circuit for interpreting the values of illumination of a group of photo-electric cells in terms of the dimensions of articles under examination.

Other objects of the invention are to provide means and apparatus of this character for indicating whether an article under examination departs from a predetermined position either by reason of wearing of the seat upon which it is disposed or the collection thereon of dust and dirt; and to provide indicating means of this kind which is highly sensitive to minutely slight changes in the position of an article under examination.

Additional objects of the invention are to provide automatic sorting apparatus which is responsive to the different light obstructing capacities of articles of diverse sizes; to provide improved means of this character for automatically segregating articles having dimensions which fall within the different predetermined limits into respectively different groups; to provide an automatic sorting tray having a plurality of trap doors for admitting articles of different sizes to respectively different bins; to provide door opening apparatus which is energizable under the control of light sensitive means for selectively opening that door of the sorting tray which leads to the bin for receiving articles of the size last previously tested; to provide means for individually releasably holding the respective trap doors open until an article tested has passed through the opening with which an open door is associated; and to provide means responsive to movements of articles into their respective bins for conditioning said doors to close.

An illustrative embodiment of the invention is shown in the accompanying drawings, in which:

Fig. 3 is a wire diagram of an electrical system for indicating errors in the position of articles under examination.

Fig. 4 is a fragmentary sectional view of a sorting tray embodying a further development of the invention and which is adapted to be controlled by the electrical system illustrated in Fig. 2.

Fig. 5 is an enlarged end elevational view of one of the doors of the sorting tray shown in Fig. 4 illustrating mechanism associated therewith for releasably holding the door in an open position.

Fig. 6 is a fragmentary side elevational view of the sorting tray illustrated in Fig. 4.

Figure 1:
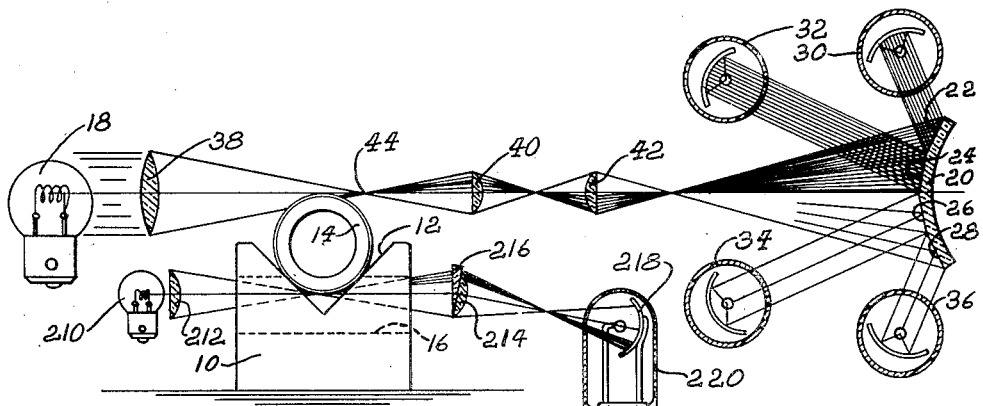
Fig. 1 is a schematic diagrammatical view, partly in section, of a measuring, sorting and grading apparatus embodying the invention.

In the form of the invention illustrated in the drawings the measuring, sorting and grading apparatus includes a support 10 having a V-shaped notch 12 formed in its upper extremity for receiving articles 14 such as roller bearings, that are to be measured, sorted or graded particularly as to diameter. Formed in the support 10 is a transversely extending passage 16 which intersects the innermost portions of the notch 12.

A source of light 18, preferably an electric light bulb, is arranged on one side of the support 10 at an elevation slightly above the notched upper extremity thereof and a multiple surface reflector 20 is located on the opposite side of the base 10 at a suitable distance therefrom, as illustrated in Fig. 1. In the apparatus shown in the drawings, the reflector 20 has four angularly disposed reflecting surfaces 22, 24, 26 and 28, each of which is positioned to direct rays of light upon respective photo-electric cells 30, 32, 34 and 36. Interposed between a source of light 18 and reflector 20 is a system of optical lenses including converging lenses 38, 40 and 42 which are so constructed and arranged as to direct a predetermined portion of the rays of light emitted from the source of light 18 upon the reflector 20. The first lens 38 has a focal point 44 located rearwardly of the vertical plane of the V-shaped notch 12 so that rollers supported in the latter may extend more or less, depending on their diameter, into the rays of light converged by the lens 38 in advance of the focal point thereof.

The diameter of the roller under examination thus determines the amount, if any, of obstruction of the light rays converged by the lens 38 that will be obstructed and prevented from reaching the reflector 20. In the illustration shown in Fig. 1, the roller 14 obstructs the lower half only of the light rays converged by the lens 38, and therefore, shadows the two adjacent reflecting surfaces 22 and 24 as illustrated in dark lines in Fig. 1. Accordingly the associated photo-electric cells 30 and 32 respectively are not illuminated whereas the photo-electric cells 34 and 36 are illuminated. In assorting rollers of different sizes this condition is preferably caused to occur when a roller of standard or mean diameter, for example .8592 inch is under test. If the roller is materially oversize all of the light rays converged by the lens 38 will be obstructed from passing to the reflector 20 and accordingly none of the photo-electric cells will be illuminated, this condition indicating that the roller equals or exceeds a diameter of .85931 inch, for example. Obviously the roller 14 would be so far undersize as to permit all of the light rays converged by the lens 38 to be directed upon the reflector 20 and to thereby permit illumination of all four photo-electric cells. This would indicate that the roller does not exceed a calibrated value, for example, .85909 inch.

If the roller is but slightly undersize it will obstruct only a portion of the lower half section of the light rays converged by the lens 38 and as a result the reflecting surface 22 will be the only portion of the reflector 20 which is shadowed, thereby causing the photo-electric cells 32, 34 and 36 to be illuminated and the photo-electric cell 30 to be shadowed. The apparatus may be calibrated so that this condition will indicate a roller size of .8591, for example. If the roller 14 is slightly oversize, it may obstruct all of the lower half section of the light rays converged by the lens 38 and only a portion of the upper half section of such light rays. Under these conditions the reflecting surfaces 22, 24 and 26 are shadowed and only the photo-electric cell 36 is illuminated by those light rays which reach the reflecting surface 28. The apparatus may be calibrated to indicate a roller diameter of .8593, for example, when this condition exists.

Figure 2:
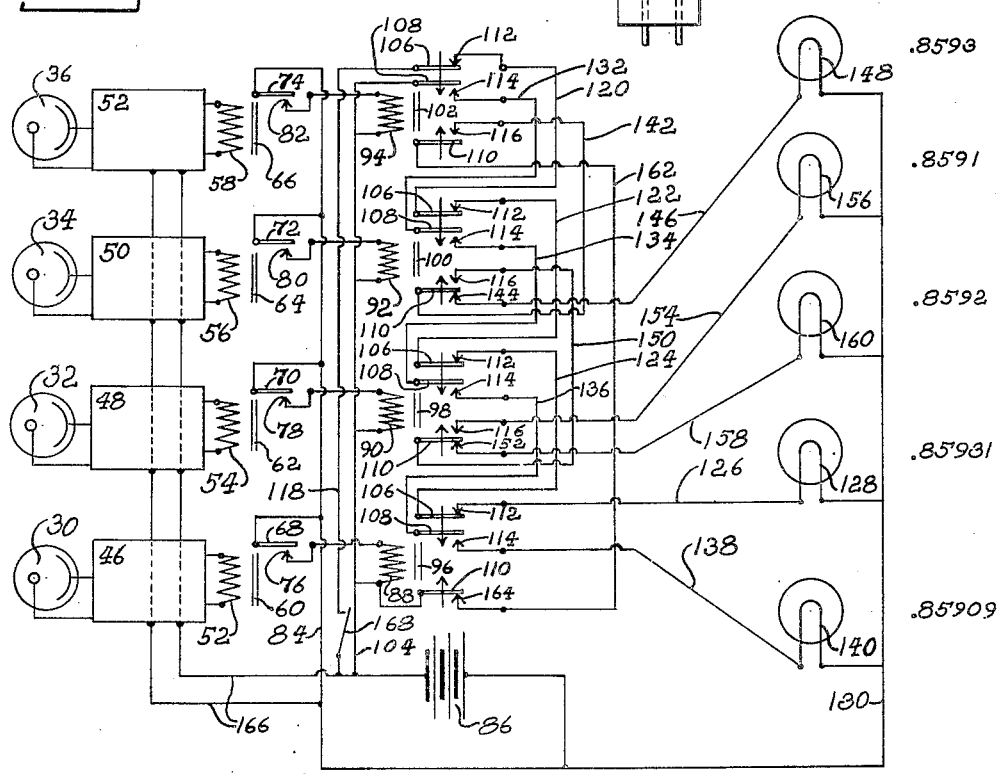
Fig. 2 is a wire diagram illustrating an electrical system suitable for interpreting the light obstructing values of articles under examination into conveniently perceivable units of measurement.

In Fig. 2 of the drawings is illustrated in a wire diagram form, an electrical system by which the energy created by illumination of the photo-electric cells 30, 32, 34 and 36 may be amplified and utilized to selectively individually energize respectively different circuits which may, as illustrated in Fig. 2, be relied upon to produce suitable different signals, as for example by illuminating differently colored lamps or by operating suitable mechanically automatic sorting mechanism. Each photo-electric cell 30, 32, 34 and 36 is electrically connected with an amplifier 46, 48, 50 and 52, respectively, which is in turn electrically connected with the windings 52, 54, 56 and 58 of an initial relay 60, 62, 64 and 66, respectively. The relays 60, 62, 64 and 66 are provided with movable normally open contacts 68, 70, 72 and 74 and fixed contacts 76, 78, 80 and 82. All of the movable contacts are electrically connected by a conductor 84 with one terminal of a suitable source of electric energy 86, and each fixed contact 76, 78, 80 and 82 is electrically connected with a winding 88, 90, 92 and 94 of a second set of relays 96, 98, 100 and 102 respectively. A conductor 104 electrically connects the other terminal of the source or battery 86 with all of the windings 88, 90, 92 and 94 of the second set of relays.

Each relay of the second set is provided with an upper pair of movable contact elements 106 and 108 and with a lower single contact element 110. The movable contact element 106 of each relay, which is normally closed, engages a fixed contact 112 while the movable contact 108, which is normally open in relay 102 and normally closed in relays 100, 98 and 96, is adapted to engage a fixed contact 114. The movable contact 110 is adapted to engage a fixed contact 116. Inasmuch as the parts of the relays 96, 98, 100 and 102 are substantially identical, corresponding parts of each relay are correspondingly designated by the same numerals.

The movable contact element 106 of the relay 102 is electrically connected by a conductor 118 with one terminal of the battery 86 and the fixed contact 112 of this relay is electrically connected by a conductor 120 with the movable contact 106 of the relay 100, and the fixed contact 112 of the relay 100 is electrically connected with the movable contact 106 of the relay 98 by a conductor 122. The fixed contact 112 of the relay 98 is in turn electrically connected by a conductor 124 with the movable contact 106 of the relay 96 and the fixed contact 112 of this relay is electrically connected by a conductor 126 with one terminal of an electric lamp 128, or other suitable indicating device. The opposite terminal of the indicating device 128 is electrically connected by a conductor 130 with the battery 86.

The movable contact 108 of the relay 102 is electrically connected with the conductor 104 leading from one terminal of the battery 86 and the fixed contact 114 of this relay is electrically connected by a conductor 132 with the movable contact 108 of the relay 100. The fixed contact 114 of the relay 100 is in turn electrically connected by a conductor 134 with the movable contact 108 of the relay 98. The fixed contact 114 of the relay 98 is electrically connected by a conductor 136 with the movable contact 108 of the relay 96. The fixed contact 114 of the latter relay is electrically connected by the conductor 138 with an electric bulb 140 or other suitable indicating means which has an opposite terminal electrically connected with the conductor 130.

The fixed contact 116 of the relay 102 is electrically connected by a conductor 142 with the movable contact 110 of the relay 100. The movable contact 110 of the relay 100 is normally in electrical contact with a fixed contact 144 which is electrically connected by a conductor 146 with one terminal of a light bulb 148, the other terminal of which is connected with the conductor 130. Associated with the movable contact 110 of the relay 100 is a fixed contact 116 which is normally disengaged from the movable contact 110. The fixed contact 116 of the relay 100 is electrically connected by a conductor 150 with the movable contact element 110 of the relay 98, which is normally in closed engagement with the fixed contact element 152 having a conductor 158 leading therefrom to one terminal of a light bulb 160 which has its other terminal electrically connected with the conductor 130. The fixed contact 116 of the relay 98 is normally disengaged from the movable contact 110 and is electrically connected by a conductor 154 with one terminal of a light bulb 156 having its other terminal electrically connected with the conductor 130.

The movable contact 110 of the solenoid 102 is electrically connected by a terminal 162 with a fixed contact 164 of the relay 96 which is normally in closed engagement with the movable contact 110 thereof. The amplifiers 46, 48, 50 and 52 are supplied with energy from the source 86 by conductors 166 with which they are connected in parallel.

In operation of the foregoing apparatus, when an article placed in the notch 12 of the support 10 is oversize, that is, larger than the maximum dimensions allowable, then all of the portions of the beam of light converged by the lens 38 are obstructed and none of the photo-electric cells 30, 32, 34 and 36 are illuminated. As a result of this condition, none of the first set of relays 52, 54, 56 and 58 are energized and therefore none of the second set of relays 96, 98, 100 and 102 are energized. The various contacts of the elements remain in the position illustrated in the drawings and the presence of current in the conductor 118, occasioned by closing of a switch 168, either automatically by the placement of the object to be tested upon the support 10 or manually by the operator, causes a flow of current through the movable contact 106 of the relay 102 which is normally closed; through the conductor 120 to the movable contact 106 of the relay 100 which is also normally closed; through the conductor 122 to the normally closed movable contact 106 of the relay 98 and from there through the conductor 124 to the normally closed movable contact 106 of the relay 96, and from the latter through the conductor 126 to the lamp bulb 128, the energization of the lamp bulb 128 or any other signalling device being employed to designate that the article exceeds the dimension of .85931 inch, for example.

When the article under examination is, for example, of the maximum allowable size the photo-electric cells 30, 32 and 34 will be shaded and only the photo-electric cell 36 will be illuminated. As a result of this condition, the amplifier 52 will energize the winding 58 of the relay 66 so as to bring the movable contact 74 thereof into engagement with the fixed contact 82 thereby supplying current to the winding 94 of the relay 102 by which the movable contact 106 is opened and the movable contact 108 is brought into engagement with its fixed contact 114. The branch circuit including the conductors 104 and 132 is not completed for the movable contact 108 of the relay 100 is not engaged with the fixed contact 114 thereof. Current is supplied from the conductor 104 to the movable contact 110 of the relay 96 which is closed, and from the latter to the movable contact 110 of the relay 102 by the conductor 162. Inasmuch as the movable contact 110 of the relay 102 is closed under the foregoing conditions, the circuit is completed through the conductor 142 and movable contact 110 of the relay 100 which is normally engaged with the fixed contact 144, and through the conductor 146 to the light bulb 148. Light bulb 148 is the only signal energized for circuits of all of the other light bulbs are open.

When the article tested is of mean or standard dimensions the photo-electric cells 30 and 32 are shadowed while the photo-electric cells 34 and 36 are illuminated thereby energizing both amplifiers 52 and 50, their associated relays 66 and 64 respectively and both relays 102 and 100 of the second series of relays. Under these conditions the current is prevented from flowing through the movable contact 106 of the relay 102 by reason of its being open and no current flows through the circuit including the movable contacts 108 because the movable contact 108 of the relay 98 is open. Current is supplied by the conductor 162 to the movable contact 110 of the relay 102 which is closed due to energization of the latter relay. A circuit is then kept through the conductor 142, movable contact 110 of the relay 100, fixed contact 116 with which the movable contact 110 engages when the relay 100 is energized, and then through the conductor 150 to the movable contact 110 of the relay 98 and ultimately through the conductor 158 which leads to the light bulb 160. Inasmuch as the relay 98 is not energized under the foregoing conditions the movable contact 110 thereof remains in its normally closed relationship with respect to the fixed contact 152 with which the conductor 158 is connected. Since no other circuit of any of the lamp bulbs is energized, the lamp bulb 160 produces the only signal. When the article under examination is only slightly undersize the photo-electric cell 130 will be shadowed and the remaining cells 132, 134 and 136 will be illuminated thereby energizing amplifiers 52, 50 and 48 simultaneously. The relays 66, 64 and 62 with which these amplifiers are respectively connected and cause the relays 102, 100 and 98 to be simultaneously energized. As a result of this condition, a circuit is completed through the conductor 162, movable contact 110 of the relay 102, conductor 142, movable contact 110 of relay 100, conductor 150, movable contact 110 of relay 98 and conductor 154 which is in turn connected with the lamp bulb 156. The circuit of the lamp bulb 148 is open by reason of the non-contacting relationship between the movable contact 110 of the relay 100 and its fixed contact 144. The circuit of the lamp bulb 160 is open by reason of the non-contacting relationship between the movable contact 110 of the relay 98 and its fixed contact 152 while the relay 98 is energized. The circuit of the lamp 148 is broken by reason of the movable contact 106 of the relay 102 being opened when the latter relay is energized and since the relay 96 is not energized the movable contact 108 thereof is in its normally open position, thereby interrupting the circuit of the lamp 140.

Upon testing an article which is under the minimum allowable dimensions, for example, it will be found that all of the photo-electric cells will be illuminated and accordingly all of the amplifiers and their associated relays of the first and second sets will also be energized. Under this condition a circuit is completed through the conductor 104, movable contact 108 of relay 102, conductor 132, movable contact 108 of relay 100, conductor 134, movable contact 108 of relay 98, conductor 136, movable contact 108 of relay 96 and then through the conductor 138 to the lamp bulb 140. The circuits of lamps 148, 160 and 128 are broken in the foregoing manner while the circuit of lamp 156 is broken by reason of non-contacting relationship of the movable contact 110 of relay 98 with its fixed contact 164 thereof which results from energizing of the relay 96. Therefore, only the lamp 140 is energized when all of the photo-electric cells are illuminated.

In place of the signals or lamp bulbs illustrated in Fig. 2, the circuit shown in this figure may be employed to automatically operate a sorting tray of the character shown in Figs. 4, 5 and 6. A sorting tray, generally designated by the numeral 170, includes a channel shaped inclined passage having a floor 172 and opposite side walls 174. Formed in the floor 172 are spaced openings 176 corresponding in number to the number of control circuits operable by the selected number of photoelectric cells employed in the system. Where four photo-electric cells are present five openings may be provided in the sorting tray. Pivotally mounted adjacent an edge of each opening 176 is a door or closure 178 which is normally urged toward a closed position by a spring 180. Mounted externally of the sorting tray 170 is a door opening mechanism including a pinion 182 fixed to shaft 184 by which the door 172 is mounted. The shaft 184 of each door is journaled in brackets mounted on the floor 172 of the tray and rigidly fixed to the door.

The teeth of the pinion 182 are meshed with teeth of a rack 186 formed integral with a shiftably mounted armature 188 of a solenoid, generally designated by the numeral 190. The armature 188 is normally held in retracted position by a spring 192 so as to cooperate with the spring 180 in urging the door toward its closed position.

Slidably mounted on one edge of each door is a latch 194 having a slot 196 in which a pin 198 is disposed for both slidably and pivotally securing the latch to the door. The latch 194 is releasably held in an extended position by coil springs 200 so as to retain it in registration with a pin 202, as illustrated in Fig. 5, for releasably holding the door in open position. Attached to the lower extremity of the slidably and pivotally mounted latch 194 is a bracket 204 having a laterally extending seat 206 in its inner extremity. The latch mechanism is so constructed and arranged that as an article passes through the opening 176 with which it is associated and is disposed in the seat 206 of the bracket 204, the weight of the article moves the latch bar 194 downwardly so as to disengage it from the pin 202 thereby permitting the door to be closed under the action of the springs 180 and 192.

The door opening latch and releasing mechanism associated with each of the openings 176 is identical and the solenoid of each door opening unit is connected with one of the pairs of terminals leading to the lamps 148, 156, 160, 128 and 140, the lamps being preferably dispensed with.

In operation, an article is placed upon the support 10 in the manner described in the discussion of Fig. 2, the relays are set to energize only one of the pairs of terminals leading to the respective solenoids 190. The solenoid opens the appropriate door of the sorting tray and the door remains open until the article under examination passes through its appropriate opening and into a bin 208, one of which is associated with each opening 176, respectively. After the tested article passes through its appropriate opening it operates the door releasing mechanism and is thereafter discharged into the bin as the door closes. The following cycle of operation takes place after the placing of each successive article on the support 10.

The measuring, sorting and grading apparatus is provided with means for checking the accuracy of the position of the article under examination which is illustrated in Figs. 1 and 3. This checking apparatus includes a lamp bulb 210 or other source of light which is disposed in relatively close proximity to a converging lens 212 that is adapted to converge a beam of light and direct the same through the passage 16 of the support 10. The focal point of the lens 212 is located substantially at or slightly in advance of a vertical plane through the vertex of the notch 12. Mounted adjacent the outlet end of the passage 16 is a combined converging lens 214 and a prism 216 by which the beam of light is bent downwardly and again converged and directed upon the light sensitive element 218 of a photo-electric cell 220. The source of light 210, lenses 212 and 214 and the photo-electric cell 220 are so constructed and arranged that when the article under examination is properly positioned and the surfaces of the notch 12 are free from wear and dust, a predetermined portion of the beam of light initially converged by the lens 212 will be directed upon the photo-electric cell thereby providing a current of predetermined character which is conducted by the conductors 222 to an amplifier 224, shown in Fig. 3. The amplifier supplies current to a pair of relatively balanced relays 226 and 228 having windings 230 and 232 respectively connected in parallel with the amplifier. The relay 226 has a movable contact element 234 which is connected by a conductor 236 with a lamp bulb or other suitable signal 238. This latter relay also has a fixed contact 240 connected by a conductor 242 with a source of electrical energy 244 which in turn is connected to the other terminal of the signal 238 by a conductor 246.

The relay 228 has a movable contact element 248 connected by a lead 250 with the conductor 236 and it includes a fixed contact 252 connected by a lead 254 with the terminal 240. The signal 238 is, therefore, energized when either of the relays 226 or 228 is closed. The movable contact element 234 of the relay 226 is normally held in an open position and retained against closing by the action of the solenoid of the relay when its winding 230 is energized to that extent which corresponds to the normal amount of illumination of the photo-electric cell 220 which is applied thereon when the article under examination is properly positioned. The movable contact element 248 of the relay 228 is normally held open by the excitation of the coil 232 which is produced when the photo-electric cell is illuminated to a normal amount corresponding to proper positioning of the article. Any less illumination of the photo-electric cell 220 caused by lowering of the article due to scoring of the surface of the notch 12 will permit the movable contact 248 of the relay 228 to close and complete a circuit through the signal. Any greater illumination of the photo-electric cell 220 occasioned by the presence of particles of dirt or other foreign matter on the surface of the notch 12 will permit a greater than normal amount of illumination of the photo-electric cell 220 and a correspondingly greater excitation of the winding 230 of the relay 226 thereby bringing the movable contact element 234 into engagement with its fixed contact 240 and completing the circuit through the signal 238. In the foregoing measuring, sorting and grading apparatus only one source of light is required to operate a plurality of photo-electric cells.

A larger number of sizes may be measured, graded and sorted than the number of photo-electric cells used, and by virtue of the inherent construction and arrangement of the parts of the apparatus a high degree of precision is obtainable. A warning is immediately given the operator upon the occurrence of any displacement of the article under examination from its intended position either by reason of wear, irregularity or the collection of dirt on the article or its support.

Although but several specific embodiments of the invention are herein shown and described, it will be understood that various changes in the size, shape and arrangement of parts may be made without departing from the spirit of my invention, and it is not my intention to limit its scope other than by the terms of the appended claims.

What I claim is:

1. Measuring apparatus including a source of light, a plurality of light sensitive units spaced therefrom, means for normally dividing a beam of light from said source into predetermined beam sections and directing said beam sections in angular relationship with respect to each other, one upon each of said light sensitive units respectively, a support so constructed and arranged as to position each of a plurality of articles of different sizes in correspondingly different light obstructing relation with respect to said beam respectively, and means for interpreting the light obstructing properties of said articles in terms of their dimensions.

2. Measuring apparatus including a source of light, a plurality of light sensitive units spaced therefrom, means for normally directing a different portion of a beam of light from said source upon each of said light sensitive units respectively, a plurality of indicating members greater in number than the number of said light sensitive units each so constructed and arranged as to represent a measurement of a different article respectively and all of said members being controlled by said light sensitive units, a support for positioning each of said articles in a different light obstructing relation with respect to said beam respectively, and means for electrically interconnecting said light sensitive units and said indicating members and so constructed and arranged as to cause operation of a different one of said indicating means when all, none, one and different groups of less than all of said light sensitive units are illuminated respectively.

3. Apparatus for measuring relatively small articles including a single source of light, a plurality of light sensitive units spaced therefrom, means for normally directing a different portion of a beam of light from said source upon each of said light sensitive units respectively, a plurality of indicating members greater in number than the number of said light sensitive units each so constructed and arranged as to represent a measurement of a different article respectively and all of said members being controllable by said light sensitive units, a support for positioning each of said articles in a different light obstructing relation with respect to said beam respectively, an amplifier electrically connected with each light sensitive unit respectively, a set of relays one associated with each amplifier and energizable thereby, and a circuit including a source of electrical energy electrically connected with said indicating members and including a second set of relays each responsive to actuation of said first set of relays and each having fixed and movable contacts so constructed, arranged and connected with said indicating members as to operate a different one thereof when all, none, one and different groups of less than all of said light sensitive units are illuminated respectively.

4. Measuring apparatus including a source of light, a plurality of photo-electric cells spaced therefrom and disposed in misaligned arrangements, means for dividing a beam of light into predetermined beam sections and normally directing said beam sections angularly with respect to each other, one upon each photo-electric cell respectively, a support so constructed and arranged as to position each of a plurality of articles of different sizes in correspondingly different light obstructing relation with respect to said beam respectively, and means responsive to illumination of all, none, one and different groups of less than all of said photo-electric cells respectively for interpreting the light obstruction properties of said articles in terms of their measurement.

5. Measuring apparatus including a source of light, a plurality of photo-electric cells spaced therefrom, means for normally dividing a beam of light from said source into predetermined beam sections and directing said beam sections angularly with respect to each other, one upon each photo-electric cell respectively, and means between said first named means and said source of light for positioning each of a plurality of articles having a different common measurement in correspondingly different light obstructing relation with respect to the portions of said beam corresponding to said beam sections respectively.

6. Measuring apparatus including a single source of light, a plurality of photo-electric cells spaced therefrom, means for normally directing a different portion of a beam of light from said source angularly with respect to the remaining portions thereof and upon each photo-electric cell respectively, a support so constructed and arranged as to position each of a plurality of articles of different sizes in correspondingly different light obstructing relation with respect to said beam respectively, and means responsive to the resulting illumination of different numbers of said photo-electric cells for indicating the sizes of articles under examination.

7. Measuring apparatus including a source of light, a plurality of photo-electric cells spaced therefrom, means for normally directing a different portion of a beam of light from said source angularly with respect to the remaining portions thereof and upon each photo-electric cell respectively, a support so constructed and arranged as to position each of a plurality of articles of different sizes in correspondingly different light obstructing relation with respect to said beam respectively, and means responsive to the resulting illumination of different numbers of said photo-electric cells for sorting articles of like sizes into respective groups.

8. Sorting apparatus including a source of light, a plurality of photo-electric cells spaced therefrom, means for normally directing a different portion of a beam of light from said source angularly with respect to the other portions thereof and upon each of said photo-electric cells respectively, a support for positioning each of said articles in a different light obstructing relation with respect to said beam respectively, and means responsive to illumination of different numbers of said photo-electric cells for sorting articles of like sizes into respective groups.

9. In measuring apparatus, a support having a reference surface for retaining articles in a predetermined position, a source of light, means for so directing a beam of light from said source that a predetermined portion thereof is obstructed by an article properly positioned by said support, a light sensitive unit responsive to variations in the unobstructed portion of said beam, an amplifier connected with said unit, an electric circuit including a source of energy and a normally inoperative signal, and a pair of normally open relays in said circuit and to actuate said signal each adapted to independently close said circuit, each of said relays being connected with and operable by said amplifier, one of said relays being adapted to close when the current of said amplifier exceeds a predetermined value and the other relay being adapted to close when the current of said amplifier decreases below said predetermined value.

10. In measuring apparatus including means for detecting the departure of the dimensions of articles from predetermined limits; mechanism for accurately establishing the positions of articles under examination with respect to said means including a support having a recess provided with a reference surface for retaining an article in a predetermined position, said support having a passage therethrough intersecting a portion of said recess normally occupied by a portion of an article on said support, a source of light, means for so directing a beam of light from said source and through said passage that a predetermined portion thereof is obstructed by an article properly positioned by said support, and indicating means including a light sensitive unit responsive to variations in the unobstructed portion of said beam for giving a warning when an article on said support is displaced from said predetermined position.

11. In measuring apparatus, a support having a recess provided with a reference surface for retaining an article in a predetermined position, said support having a passage therethrough intersecting a portion of said recess normally occupied by a portion of an article on said support, a source of light, means for so directing a beam of light from said source and through said passage that a predetermined portion thereof is obstructed by an article properly positioned by said support, a light sensitive unit responsive to variations in the unobstructed portion of said beam, an amplifier connected with said unit, an electric circuit including a source of energy and a normally inoperative signal, and a pair of normally open relays in said circuit each adapted to independently close said circuit and to actuate said signal, each of said relays being connected with and operable by said amplifier, one of said relays being adapted to close when the current of said amplifier exceeds a predetermined value and the other relay being adapted to close when the current of said amplifier decreases below said predetermined value.

12. Measuring apparatus including a source of light, a plurality of light sensitive units spaced therefrom, means for normally directing portions of a beam of light from said source upon each of said light sensitive units respectively, a support so constructed and arranged as to position each of a plurality of articles of different sizes in correspondingly different light obstructing relation with respect to said beam respectively, means for interpreting the light obstructing properties of said articles in terms of their dimensions, means for so directing a second beam of light that a predetermined portion thereof is obstructed by an article properly positioned by said support, and indicating means including a light sensitive unit responsive to variations in the unobstructed portion of said second beam for giving a warning when an article on said support is displaced from said predetermined position.

13. Measuring apparatus including a source of light, a plurality of light sensitive units spaced therefrom, means for normally directing a different portion of a beam of light from said source upon each of said light sensitive units respectively, a plurality of indicating members greater in number than the number of said light sensitive units each so constructed and arranged as to represent a measurement of a different article respectively, a support for positioning each of said articles in a different light obstructing relation with respect to said beam respectively, means for electrically interconnecting said light sensitive units and said indicating members and so constructed and arranged as to cause operation of a different one of said indicating means when all, none, one and different groups of less than all of said light sensitive units are illuminated respectively, means for so directing a second beam of light that a predetermined portion thereof is obstructed by an article properly positioned by said support, and indicating means including a light sensitive unit responsive to variations in the unobstructed portion of said second beam for giving a warning when an article on said support is displaced from said predetermined position.

14. Measuring apparatus including a source of light, a plurality of photo-electric cells spaced therefrom, means for normally directing a different portion of a beam of light from said source upon each photo-electric cell respectively, a support so constructed and arranged as to position each of a plurality of articles of different sizes in correspondingly different light obstructing relation with respect to said beam respectively, means responsive to the resulting illumination of different numbers of said photo-electric cells for indicating the sizes of articles under examination, means for so directing a second beam of light that a predetermined portion thereof is obstructed by an article properly positioned by said support, and indicating means including a light sensitive unit responsive to variations in the unobstructed portion of said second beam for giving a warning when an article on said support is displaced from said predetermined position.

15. In sorting apparatus, a sorting tray including a trough having a plurality of doors in a wall thereof, a bin below each door, means normally urging each door toward a closed position, a door opening unit associated with each door, means for independently releasably retaining each door in an open position, each retaining means being operable in response to the passage of an article through the door with which it is associated to permit closing of said door thereafter, a source of light, a plurality of photo-electric cells spaced therefrom, means for normally directing a different portion of a beam of light from said source upon each photo-electric cell respectively, a support so constructed and arranged as to position each of a plurality of articles of different sizes in correspondingly different light obstructing relations with respect to said beam respectively, and means responsive to the resulting illumination of different numbers of said cells and operatively connected with said door opening units for automatically opening a door corresponding to the size of an article under examination when such article is placed on said support.

16. Measuring and sorting apparatus including a single source of light, a plurality of light sensitive units disposed in spaced misaligned relationship, means for dividing a beam of light from said source into a plurality of beam sections and directing said beam sections angularly with respect to each other, one upon each light sensitive unit respectively, a support for retaining a plurality of articles of different sizes in different corresponding light obstructing relations with respect to said beam, and means responsive to the illumination of said units for designating into which of a plurality of limits of measurement an article placed upon said support is properly classifiable.

RALPH A. POWERS.